United States Patent [19]

Hardwick

[11] 4,027,808

[45] June 7, 1977

[54] RECEPTACLE TRANSPORTING VEHICLE

[76] Inventor: Thomas Lee Richard Hardwick, 1212 S. Parker Road, Olathe, Kans. 66061

[22] Filed: Mar. 29, 1976

[21] Appl. No.: 671,623

[52] U.S. Cl. .................................. 214/313; 298/11
[51] Int. Cl.² .......................................... B65G 65/04
[58] Field of Search .......... 214/312, 313, 314, 315, 214/502; 298/11

[56] References Cited

UNITED STATES PATENTS

| | | | |
|---|---|---|---|
| 1,985,169 | 12/1934 | Howell et al. | 298/11 |
| 2,672,247 | 3/1954 | Jewett | 214/314 |
| 3,083,850 | 4/1963 | Owen | 214/502 |
| 3,330,429 | 7/1967 | Kress | 214/314 |
| 3,825,135 | 7/1974 | Kress | 214/313 |
| 3,863,791 | 2/1975 | Brock | 214/314 |

*Primary Examiner*—Lawrence J. Oresky
*Attorney, Agent, or Firm*—Fishburn, Gold & Litman

[57] ABSTRACT

A receptacle transporting vehicle adapted to carry an open top receptacle, such as a slag pot, includes a support frame adapted to retain and support the receptacle thereon and a base frame having the support pivotally mounted thereon for movement between a first position for carrying the receptacle and a second position for discharging contents of the receptacle. The base frame is mounted on a carrier frame for movement longitudinally of the carrier frame and for raising and lowering the base frame and the support frame thereon between a raised carrying position and a lower receptacle receiving position.

3 Claims, 7 Drawing Figures

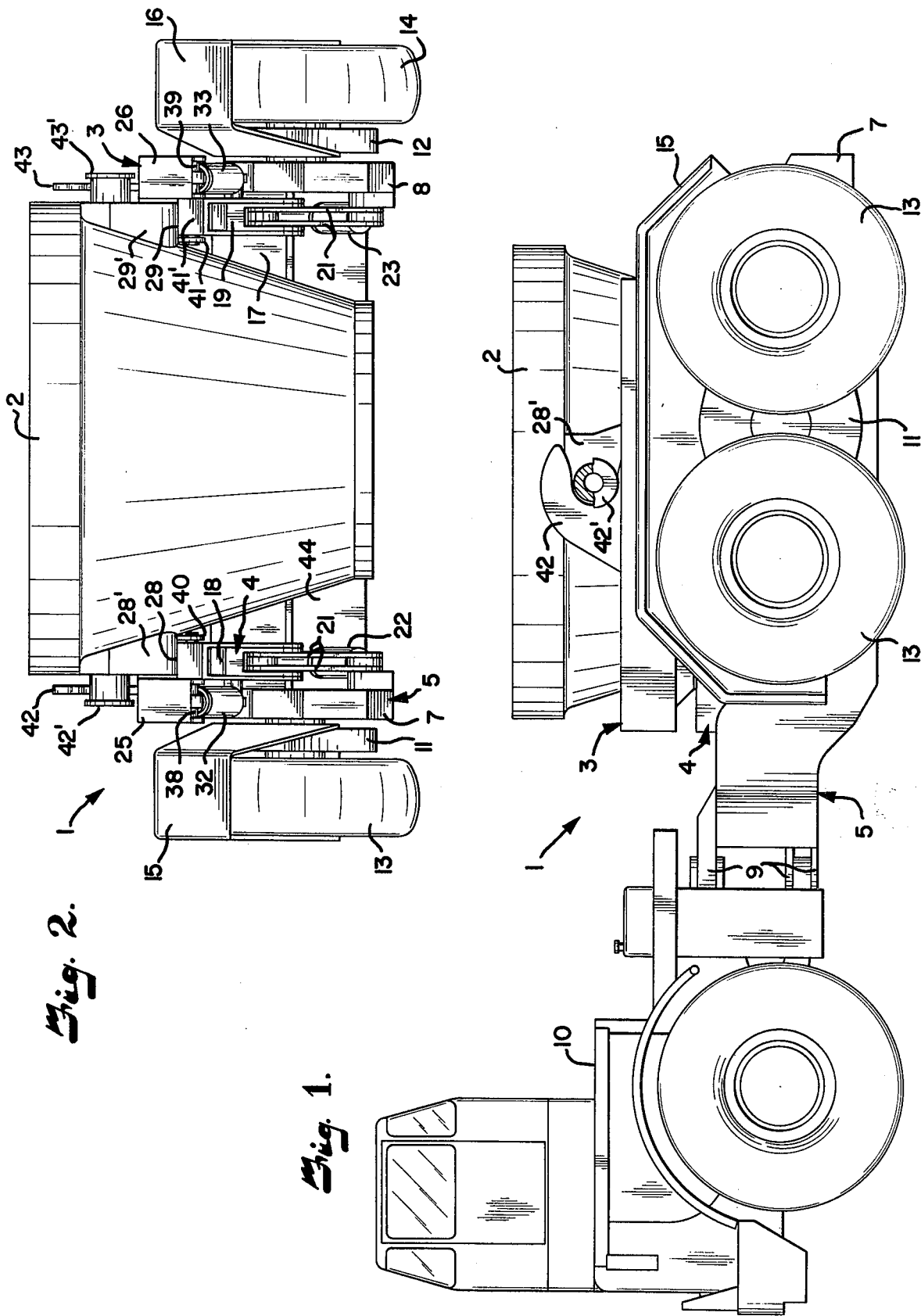

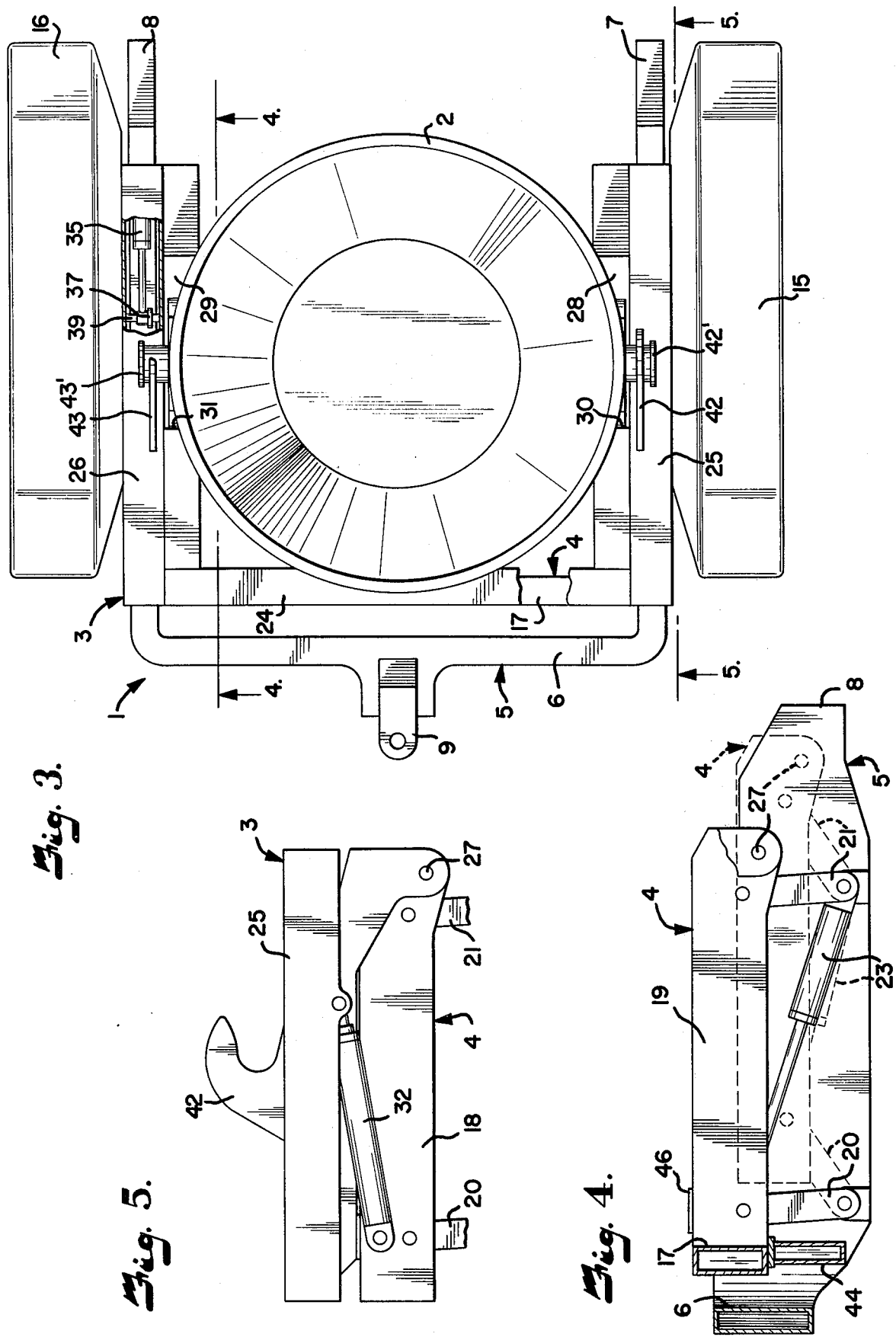

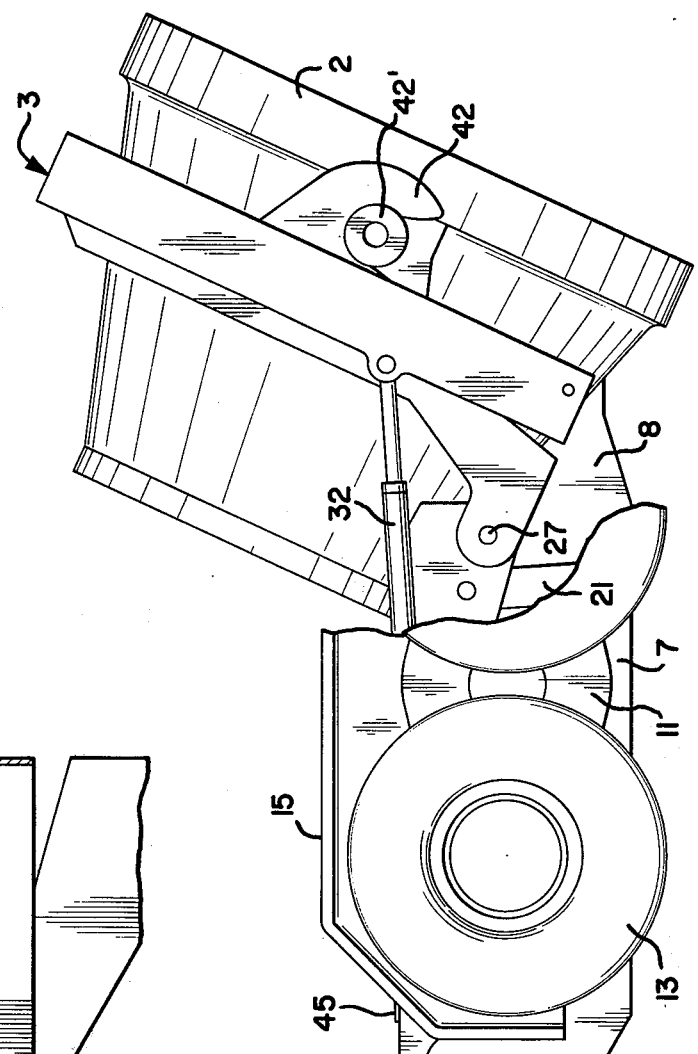
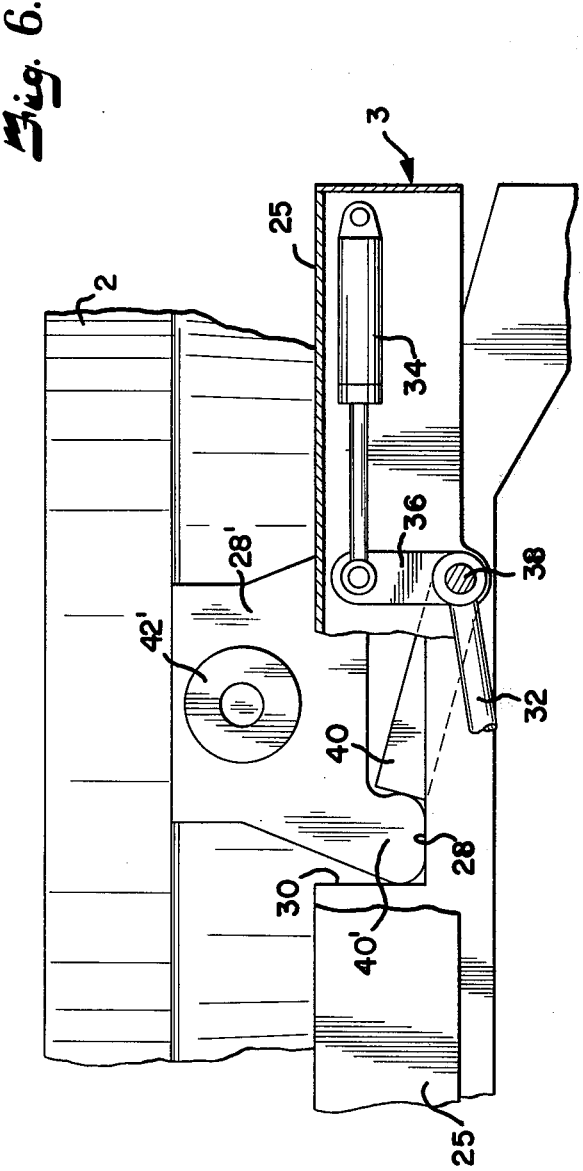

RECEPTACLE TRANSPORTING VEHICLE

The present invention relates to receptacle carrying vehicles and more paticularly to a receptacle transporting vehicle adapted to discharge contents of a receptacle while retaining the receptacle in supported engagement.

The principal objects of the present invention are: to provide a receptacle transporting vehicle adapted to transport and dump large great weight receptacles, such as slag pots and the like, rearwardly of the vehicle; to provide such a receptable transporting vehicle adapted to receive and move a receptacle to a supported and retained position with a minimum of movement by component parts of the vehicle; to provide such a receptacle transporting vehicle adapte to discharge contents of a receptacle while retaining an upper portion of the receptacle in supporting engagement; to provide such a receptacle transporting vehicle adapted to be connected to a prime mover and adapted to be self-supporting when not connected to the prime movement; to provide such a receptacle transporting vehicle to travel over pavement or other surfaces with a minimum of disturbance of the contents of the receptacle; to provide such a receptacle transporting vehicle adapted to carry a receptacle and contents thereof weighting between 400,000 and 500,000 lbs.; and to provide such a receptacle transporting vehicle which is durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the receptacle transporting vehicle.

FIG. 1 is a side elevational view of a receptacle transporting vehicle embodying features of the present invention and showing components in position for carrying a receptacle.

FIG. 2 is a rear elevational view of the receptacle transporting vehicle with portions broken away to illustrate component parts thereof.

FIG. 3 is a top plan view of the receptacle transporting vehicle with portions broken away to illustrate component parts thereof.

FIG. 4 is a fragmentary longitudinal sectional view taken on line 4—4, of FIG. 3 and showing means for effecting movement of a base frame relative to a carrier frame.

FIG. 5 is a fragmentary longitudinal sectional view taken on line 5—5 of FIG. 3 and showing means for effecting movement of a support frame relative to a base frame.

FIG. 6 is an enlarged fragmentary side elevational view showing means for retaining a receptacle on the support frame.

FIG. 7 is a side elevational view similar to FIG. 1 except showing components in position for discharging contents of the receptacle.

As required, detailed embodiments of the present invention are disclosed herein. However, it is to be understood that the enclosed embodiments are merely exemplary of the invention which may be embodied in various forms, therefore, specific structural and functional details disclosed herein are not be be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention the reference numeral 1 designated generally a receptacle transporting vehicle adapted to carry an open top receptacle 2, such as a slag pot or the like. The vehicle 1 is designed to receive and control a heavy container such as a slag pot from receiving thereof to lifting and positioning for transport and holding thereof during movement of portions of the vehicle for dumping the container contents and returning of the container to carrying position. The receptacle transporting vehicle 1 includes a support frame 3 adapted to retain and support the receptacle 2 thereon and a base frame 4 having the support frame 3 pivotally mounted thereon for movement between a first position for carrying the receptacle 2 and a second position for discharging contents (not shown) of the receptable 2. The base frame 4 is mounted on a carrier frame 5 for movement longitudinally of the carrier frame 5 and for raising and lowering the base frame 4 and the support frame 3 thereon between a raised carrying position and a lowered receptacle receiving position.

The carrier frame 5 illustrated is a generally U-shaped structure including a forward end portion 6 and a pair of side arms or members 7 and 8 extending rearwardly from the forward end portion 6 and spaced transversely outwardly from a longitudinal central axis of the carrier frame and the receptacle transporting vehicle 1.

The carrier frame 5 has connection means 9 on the forward end portion 6 thereof for connecting the carrier frame 5 to a prime mover 10 and for permitting relative movement therebetween. The connection means 9 may be any suitable structure adapted to transfer a pulling or pushing force from the prime mover 10 and permitting relative movement therebetween, such as the connection means illustrated in my U.S. Pat. No. 3,739,930 issued June 19, 1973 for COIL TRANSPORTING STRUCTURE.

The forward end portion 6 and the side members 7 and 8 of the carrier frame 5 are formed of suitable structural elements, such as plates, angles and the like, which are effective to support substantial loads, such as 400,000 − 500,000 lbs., while moving.

The carrier frame 5 is a mobile structure and has one or more surface engaging wheels mounted on each of the side members or arms 7 and 8 thereof. In the illustrated embodiment, elongated walking beams 11 and 12 are pivotally mounted on the side members 7 and 8 respectively and postioned intermediate the ends thereof.

The walking beams 11 and 12 are also formed of suitable structural elements, such as plates, angles, and the like, and are illustrated as generally rectangular cross-section box beams each having an intermediate portion thereof pivotally mounted on the intermediate portion of the respective carrier frame side members 7 and 8. The walking beams 11 and 12 each have surface engaging wheels 13 and 14 rotatably mounted on a forward end portion and a rear end portion respectively thereof.

It is desirable to protect the surface engaging wheels 13 and 14 on each of the walking beams 11 and 12, therefore, fenders 15 and 16 are mounted on the walking beams 11 and 12 respectively and each have a portion thereof covering the tread portion of the wheels 13 and 14.

The base frame 4 is also a generally U-shaped structure including a forward end portion 17 and a pair of side arms or members 18 and 19 extending rearwardly from the forward end portion 17 and spaced transversely outwardly from the longitudinal central axis of the receptacle transporting vehicle 1. The forward end portion 17 of the base frame 4 is positioned rearwardly of the forward end portion 6 of the carrier frame 5 and the side arms 18 and 19 of the base frame 4 are positioned between the side arms 7 and 8 of the carrier frame 5. The side arms 18 and 19 of the base frame 4 each have a forward end portion and a rear end portion.

The forward end portion 17 and the side members 18 and 19 of the base frame 4 are also formed of suitable structural elements, such as plates, angles and the like, which are effective to support substantial loads including the support frame 3, the receptacle 2, and the contents thereof.

The base frame 4 is mounted on the carrier frame 5 for longitudinal movement thereof toward and away from the forward end portion 6 of the carrier frame 5 and for raising and lowering of the base frame 4 relative to the carrier frame 5. The illustrated movable mounting of the base frame 4 on the carrier frame 5 includes members extending between and operatively connected to the base frame 4 and to the carrier frame 5 for effecting the longitudinal movement and the raising and lowering of the base frame 4 relative to the carrier frame 5. In the illustrated embodiment, a first and second pair of longitudinally spaced forward and rear links 20 and 21 each have a lower end portion thereof pivotally connected to forward and rear end portions respectively of the carrier frame side members 7 and 8. An upper end portion of the forward and rear links 20 and 21 of each of the first and second pair of longitudinally spaced links are pivotally connected to respective forward end portions and rear end portions of the base frame side members 18 and 19 respectively. The links 20 and 21 of each of the pairs of links are coplanar and positioned in parallel alignment and each of the links is formed of laterally spaced parallel plates or bars. Opposite end portions of the links 20 and 21 are mounted on suitable pivot pins.

A first extensible power member 22 extends between the links 20 and 21 pivotally connected to the side members 7 and 18 of the carrier frame 5 and the base frame 4 respectively. A second extensible member 23 extends between the links 20 and 21 pivotally connected to the side members 8 and 19 of the carrier frame 5 and the base frame 4 respectively.

The first and second extensible power members 22 and 23 each have one of the opposite ends thereof pivotally connected to the pivot pin at the lower end portion of one of the forward links 20 and the rear links 21 and the other of the opposite end portions thereof pivotally connected to the pivot pin at the upper end portion of the other of the forward links 20 and the rear links 21 whereby movement of the base frame 4 is relative to the pivotal connection of the lower end portions of the forward and rear links 20 and 21. The base frame 4 is thereby always parallel with a plane extending through the pivotal connection of the lower end portions of the links 20 and 21 to the carrier frame 5.

The pairs of links 20 and 21 and the extensible members 22 and 23 are operative to raise the base frame 4, support frame 3, and receptacle 2 and contents from the receptacle receiving position to a carrying or transporting position. During raising of the receptacle 2 and contents, the receptacle 2 and contents are also moved longitudinally of the carrier frame 5 and thereby positioned substantially forwardly of pivotal connection of the support frame 3 to the base frame 4.

The support frame 3 is also a generally U-shaped structure including a forward end portion 24 and a pair of side arms or members 25 and 26 extending rearwardly from the forward end portion 24 and spaced transversely outwardly from the longitudinal central axis of the receptacle transporting vehicle 1.

The forward end portion 24 and the side members 25 and 26 of the support frame 3 are formed of suitable structural elements, such as plates, angles and the like, which are effective to support the receptacle 2 and the contents therein.

The support frame 3 is mounted on the base frame 4 and is pivotally movable relative thereto during discharging contents of the receptacle 2. In the illustrated embodiment, the side members 25 and 26 of the support frame 3 are positioned above the side members 18 and 19 of the base frame 4 and rear end portions of the side members 25 and 26 are pivotally mounted on the rear end portion of the side members 18 and 19 respectively of the base frame 4, as by a respective pivot pin 27. Each pivot pin 27 is positioned rearwardly of the respective rear links 21 whereby movement of the support frame 3 relative to the base frame 4 is independent of movement of the base frame 4 relative to the carrier frame 5.

Each pivot pin 27 is also positioned substantially rearwardly of the mounting of the surface engaging wheels on the carrier frame 5 and the center of the receptacle 2 and contents, when in the transporting position, is positioned substantially forwardly of the mounting of the surface engaging wheels on the carrier frame. In the illustrated structure, the center of the receptacle 2 and contents is positioned between the surfacing engaging wheels 13 and 14 whereby the receptacle transporting vehicle 1 is self-supporting when not connected to the prime mover 10 and the load is positioned on the vehicle 1 for transporting.

The support frame 3 has means for supporting the receptacle 2 thereon and for releasably retaining the receptacle 2 in supported engagement on the support frame 3. In the illustrated embodiment, the side members 25 and 26 have shelf portions 28 and 29 respectively thereon and each extending forwardly from the respective rear end portion thereof. The shelf portions 28 and 29 terminate at abutments or shoulders 30 and 31 positioned adjacent the forward end portions of the side members 25 and 26 respectively. A rear end portion of each of the shelf portions 28 and 29 is inclined downwardly to permit movement of the shelf portions 28 and 29 under respective handle or bracket portions 28' and 29' respectively of the receptacle 2.

The receptacle transporting vehicle 1 includes means for effecting pivotal movement of the support frame 3 relative to the base frame 4 and between a first position for carrying the receptacle 2 and the contents therein and a second position for discharging the contents of the receptacle 2. In the illustrated structure, extensible power members 32 and 33 extend between and have respective opposite ends thereof pivotally connected to the side members 18 and 19 of the base frame 4 and to the side members 25 and 26 of the support frame 3 respectively. A forward end of the extensible power members 32 and 33 is pivotally connected to the forward end portion of the side members 18 and 19 respectively of the base frame 4. A rear end of the extensible power members 32 and 33 is pivotally connected to the side members 25 and 26 respectively of the support frame 3 intermediate the ends thereof.

The receptacle transporting vehicle 1 includes means on the support frame 3 adapted to retain the receptacle 2 on the support frame 3 during travel of the receptacle transporting vehicle 1 and during pivotal movement of the support frame 3 relative to the base frame 4, as for discharging contents of the receptacle 2.

The illustrated means for retaining the receptacle 2 on the support frame 3 includes a pair of extensible members 34 and 35 mounted on the side members 25 and 26 respectively of the support frame 3. One end of the extensible members 34 and 35 is pivotally mounted on the rear end portion of the respective side members 25 and 26 and the other end of the extensible members 34 and 35 is pivotally mounted on one end of respective links or arms 36 and 37. The other end of the arms 36 and 37 is mounted on pins 38 and 39 rotatably mounted on and extending laterally from the side members 25 and 26 respectively.

The pins 38 and 39 are positioned below the upper surface of the shelf portions 28 and 29 respectively and may have the upper or rear ends of the extensible members 32 and 33 respectively pivotally mounted thereon. A pair of brace or latch members 40 and 41 are mounted on and extend radially from the pins 38 and 39 respectively. The brace or latch members 40 and 41 have free ends thereof engageable with respective portions or lobes 40' and 41' which depend from the handle bracket portions 28' and 29' of the receptacle 2 and are adapted to hold the bracket portions in engagement with the shoulders 30 and 31 respectively. The extensible members 34 and 35 are operative to move the brace members 40 and 41 below the upper surface of the shelf portions 28 and 29 to permit relative movement between the receptacle 2 and the support frame 3, as during movement of the receptacle 2.

Hooks 42 and 43 are mounted on the side members 25 and 26 of the support frame 3 and are rearwardly open to receive therein respective handle portions or trunnions 42' and 43' of the receptacle 2. The hooks 42 and 43 cooperate with the shoulders 30 and 31 to limit forward movement of the receptacle 2 along the shelf portions 28 and 29. After the handle portions or trunnions 42' and 43' of the receptacle 2 are in engagement with the shoulders 30 and 31, the extensible members 34 and 35 are operated to move the end portions of the brace or latch members 40 and 41 into engagement with the respective handle portions or lobes 40' and 41' of the receptacle 2 thereby retaining same between the respective shoulders and brace members.

During operation of the extensible members 32 and 33 for moving the support frame 3 toward the second position for discharging the contents of the receptacle 2, the center of the receptacle 2 and the contents therein remains forwardly of each of the pivot pins 27 until a substantial portion of the contents of the receptacle have been discharged. The center of the receptacle 2 also remains between the surface engaging wheels 13 and 14 until a substantial portion of the contents of the receptacle have been discharged.

The illustrated receptacle transporting vehicle 1 is adapted to be self-supporting when disconnected from the prime mover 10, therefore, the carrier frame 5 has means thereon for supporting the base frame 4 thereon and the base frame 4 has means thereon for supporting the support frame 3 when the extensible members 22, 23, 32, and 33 are disconnected from the power source of the prime mover 10.

A support beam 44 is mounted on the carrier frame 5 and extends between the forward end portions of the side members 7 and 8 thereof. The support beam 44 is positioned to be engaged by the forward end portion 17 of the base frame 4 and thereby limit forward movement of the base frame 4.

The side arms or members 25 and 26 of the support frame 3 are positioned above the side arms or members 18 and 19 respectively of the base frame 4. Bearing plates 45 and 46 are mounted on an upper surface of the side arms 18 and 19 of the base frame 4 and are positioned to be engaged by the lower surface of the side arms 25 and 26 respectively of the support 3.

In using the receptacle transporting vehicle 1, the rear end portions of the side members 7 and 8 of the carrier frame 5 are positioned on opposite sides of the receptacle 2. The base frame 4 is then lowered and moved rearwardly by operation of the extensible members 22 and 23 and the pairs of links 20 and 21 thereby positioning the upper surface of the shelf portions 28 and 29 of the support frame 3 below respective handle portions 28' and 29' of the receptacle 2. The receptacle transporting vehicle 1 is moved rearwardly until the shoulders 30 and 31 are engaged by the respective handle portions 28' and 29' of the receptacle 2. The brace members 40 and 41 are then moved into position engaging the respective handle portions 40' and 41'. The base frame 4 and the support frame 3 with the receptacle 2 thereon are then raised and moved forwardly by the extensible members 22 and 23 and the pairs of links 20 and 21. The transporting vehicle 1 is then moved by the prime mover 10 to a desired location for discharging the contents of the receptacle 2. The extensible members 32 and 33 are operated to raise the support frame 3 relative to the base frame 4 at least to a position with an interior surface of a side wall of the receptacle 2 inclined downwardly from a bottom thereof so that the contents will flow therefrom. After the receptacle 2 has been emptied, the extensible members 32 and 33 are operated to lower the support frame 3 and the empty receptacle 2 retained thereon to the traveling position. The receptacle transporting vehicle 1 is moved to a desired location and the receptacle 2 is returned for reuse by lowering the base frame 4 until the bottom of the receptacle 2 engages a suitable support surface. The brace members 40 and 41 are moved to a position below the upper surface of the shelf portions 28 and 29 and the receptacle transporting vehicle 1 is moved away from the receptacle 2.

It is to be understood that while I have illustrated and described one form of my invention, it is not to be limited to the specific form or arrangement of parts herein described and shown.

What I claim and desire to secure by Letters Patent is:

1. A transporting vehicle for receptacles having opposed handles including trunnions and bracket portions with depening lobes thereon comprising:

a. an elongated mobile carrier frame having a forward end portion and a pair of side members extending rearwardly from said forward end portion and spaced transversely outwardly from a longitudinal central axis of said carrier frame;
b. an elongated base frame mounted on said carrier frame;
c. an elongated support frame mounted on said base frame for pivoted movement relative thereto, said support frame having a forward portion and spaced transversely outwardly from a longitudinal central axis of said support frame, said support frame side members each having an upper surface and a recessed shelf portion thereon for supporting a bracket portion of the respective handles of a receptacle on said support frame, said shelf portions each terminating at a respective upstanding shoulder adjacent said support frame forward portion for engagement by a bracket of a respective one of the receptacle handles;
d. means extending between said carrier frame and said base for effecting longitudinal movement of said base frame toward and away from said carrier frame forward end portion and for raising and lowering said base frame relative to said carrier frame;
e. means extending between said base frame and said support frame for effecting pivoted movement of said support frame between a first position for carrying a receptacle and a second position for discharging contents of the receptacle;
f. a pair of hooks each mounted on a respective one of said support frame side members and being rearwardly open to receive therein a trunnion of a respective one of the receptacle handle portions, said hooks being spaced from said shoulders and cooperating therewith to position the receptacle relative to said frame;
g. power means on said support frame for locking the receptacle handles thereto and including latch members operative for selectively engaging a depending lobe of each of the receptacle handles for retaining same in engagement with said respective shoulder during travel of said carrier frame and during pivotal movement of said support frame relative to said base frame.

2. A receptacle transporting vehicle as set forth in claim 1 wherein said power means and latch member for retaining each of the brackets of the receptacle handle portions in engagement with said respective support frame shoulder comprises:

a first and second pins each rotatably mounted on a respective one of said support frame side members;
b. first and second arms each having one end portion thereof mounted on and extending from said first and second pins respectively;
c. first and second latch members mounted on and extending radially from said first and second pins respectively; and
d. first and second extensible power members each having one end portion thereof pivotally mounted on a respective one of said support frame side members and an other end portion thereof pivotally connected to a respective one of said first and second arms whereby operation of said power members moves said latch members into and out of engagement with the lobes of the respective receptacle handle portions.

3. A receptacle transporting vehicle as set forth in claim 1 wherein said power means and latch members for releasably retaining each of the receptacle handle portions in engagement with said respective support frame shoulder comprises:

a. first and second pins each rotatably mounted on a respective one of said support frame side members and extending laterally therefrom;
b. first and second arms each having one end portion thereof mounted on and extending from said first and second pins respectively;
c. first and second latch members mounted on and extending radially from said first and second pins respectively, said latch members being substantially parallel with said first and second arms respectively, said latch members each having a free end; and
d. first and second extensible power members each having one end portion thereof pivotally mounted on a respective one of said support frame side members and an other end portion thereof pivotally connected to a respective one of said first and second arms whereby operation of said power members moves the free end of said latch members into and out of engagement with a lobe of the respective handle portions.

* * * * *